United States Patent [19]

Yamauchi et al.

[11] 4,073,733
[45] Feb. 14, 1978

[54] PVA MEMBRANE AND METHOD FOR PREPARING THE SAME

[75] Inventors: Kazuhisa Yamauchi, Kurashiki; Koichi Takakura, Okayama; Syuji Kawai; Akio Ohmori, both of Kurashiki, all of Japan

[73] Assignee: Kuraray Co., Ltd., Kurashiki, Japan

[21] Appl. No.: 679,441

[22] Filed: Apr. 22, 1976

[30] Foreign Application Priority Data

Apr. 22, 1975 Japan .................................. 50-48995

[51] Int. Cl.$^2$ ............................................. B01D 31/00
[52] U.S. Cl. .......................... 210/500 M; 260/2.5 AY; 260/2.5 M; 264/49
[58] Field of Search ............... 210/22, 500 M; 264/49, 264/41; 55/16; 260/25 M, 25 AY; 428/304

[56] References Cited

U.S. PATENT DOCUMENTS

| 3,228,877 | 1/1966 | Mahon ................................... 210/22 |
| 3,423,491 | 1/1969 | McLain et al. ............. 210/500 M X |
| 3,837,500 | 9/1974 | Nicolas et al. ....................... 64/49 X |
| 3,907,675 | 9/1975 | Chapurlat et al. ........... 210/500 M X |
| 3,951,621 | 4/1976 | Hughei et al. ............................ 55/16 |

FOREIGN PATENT DOCUMENTS

920,815  3/1963  United Kingdom ............ 210/500 M

Primary Examiner—Frank A. Spear, Jr.
Attorney, Agent, or Firm—Oblon, Fisher, Spivak, McClelland & Maier

[57] ABSTRACT

A polyvinyl alcohol semi-permeable membrane is prepared which has micropores with an average diameter of 0.02 to 2 microns as defined by the interpore partition walls having thicknesses in the range of 50 to 5000 A and which is characterized by substantial cross-sectional uniformity. The membrane is prepared by extruding a PVA composition containing PAG with a molecular weight of 400 to 4,000 and a carbon-to-oxygen ratio of not more than 3 in a proportion of 2 to 200 parts by weight per 100 parts of PVA into a coagulation bath. In another embodiment of the invention, the membrane is formed from a PVA composition wherein the PAG has a molecular weight of 600 to 3,000 and a C/O ratio of not more than 3, the proportion of the PAG being 15 to 150 parts by weight per 100 parts of PVA and wherein the composition satisfies the relation: 0.65 ≦ CBR (critical blending ratio) ≦ 1.0. The membrane is useful in ultrafiltration, dialytic and osmotic separation applications.

16 Claims, 6 Drawing Figures

PVA MEMBRANE AND METHOD FOR PREPARING THE SAME

BACKGROUND OF THE INVENTION

1. Field of the Invention

The present invention relates to heretofore unknown membranes based on a vinyl alcohol polymer (hereinafter also referred to as PVA) and to methods for producing the same. More particularly, the invention relates to a PVA dialysis, osmosis or ultrafiltration membrane of heretofore unknown structure, and to methods for producing PVA membranes by preparing a PVA composition containing a polyalkylene glycol (hereinafter referred to as PAG) to coagulate the composition in a liquid bath and, thereafter if necessary, immersing the resultant shaped article in water at an elevated temperature.

2. Description of the Prior Art

The recent past several years have witnessed remarkable advances in separatory processes which utilize membranes possessing selective permeability. These membrane separation techniques have been utilized with some success in certain applications such as in the desalination of sea water and the treatment of blood in artificial kidneys. For some applications, however, the membranes currently in use are not completely satisfactory from all aspects, such as membrane permeability or other properties.

The membranes heretofore employed in various fields of separation engineering are mainly those formed of cellulose or its derivatives. Aside from these materials, a variety of other materials have been used in the preparation of membranes which have included PVA. One such PVA membrane is an aldehyde-crosslinked PVA membrane (Leininger et al, Trans, ASAIO 10 22, 1964). Another PVA based membrane is prepared by crosslinking allyl methacrylate as a polyfunctional monomer with radiation (M. Odian et al, Trans, ASAIO 14 5, 1968; Bruce S. Bernstein, J. Polymer Sci. Part A, 3 3405 1965). Still another reference shows a polyvinyl alcohol-chitosan blend membrane (S. Yoshikawa et al, a paper presented at the 20th Annual Meeting of the High Polymer Society of Japan). Yet another reference shows a polyvinyl alcohol graft-copolymer membrane (Y. Imai et al, JINKO-ZOKI (Artificial Organs) 2 147, 1973).

All of these membranes, and for that matter, all of the membranes generally prepared from a highly hydrophilic material such as PVA, while normally exhibiting satisfactory permeability, are inferior with regard to strength, and for this reason are usually not satisfactory for dialytic and other separation applications. On the other hand, membranes with sufficient strength tend to have poor permeability. The same situation applies equally to the instances where the membranes are used as flat membranes, and to the instances where the membranes are used in the form of hollow fibers which is more advantageous from a strength quality viewpoint. It is for these reasons, irrespective of whether a permeable material is used as a hollow fiber or as a flat membrane, that the commercial exploitation of PVA membranes has not materialized.

In the research leading to the present invention, the structures of various semi-permeable membrane materials (hereinafter referred to as simply membranes) have been studied. The study, with the aid of an electron microscope, a porosimeter and other instruments, has revealed that the conventional membranes have either an asymmetric structure made up of a relatively dense layer and porous layer having micropores not less than about 10 microns in diameter, or a homogeneous structure consisting exclusively of a comparatively dense layer whose porosity is not detectable by electronmicroscopy ($\times$ 100,000).

A need therefore continues to exist for PVA-based membranes which exhibit excellent permeation selectivity and superior mechanical strength and for methods of producing such membranes.

SUMMARY OF THE INVENTION

Accordingly, one object of the present invention is to provide a semipermeable polyvinyl alcohol based membrane of high permeability and strength characteristics.

Another object of the present invention is to provide a method for forming semipermeable, polyvinyl alcohol based membranes which possess both high permeability and strength characteristics.

Still another object of the present invention is to provide a polyvinyl alcohol based semipermeable membrane useful in ultrafiltration, dialytic and osmotic separation application.

Briefly, these objects and other objects of the present invention as hereinafter will become more readily apparent can be attained by a polyvinyl alcohol based membrane whose structure is characterized by a multiplicity of micropores having an average diameter of 0.02 to 2 microns as defined by interpore partition walls having thicknesses ranging from 50 to 5000 A and distrubuted with substantial uniformity throughout the cross-section thereof. The membrane can be prepared by extruding a dope of a polyvinyl alcohol composition containing PAG with a molecular weight of 400 to 4,000 and a carbon-to-oxygen ratio of not more than 3 in a proportion of 2 to 200 parts by weight per 100 parts of PVA into a coagulation bath.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
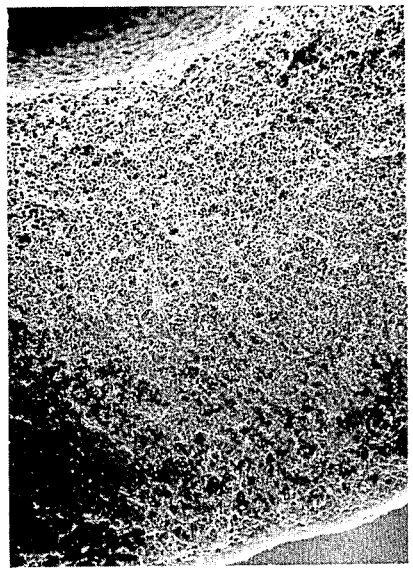
FIG. 1 is an electron-microscopic photograph of the cross-sectional area of a typical PVA membrane according to this invention.
Figure 3:
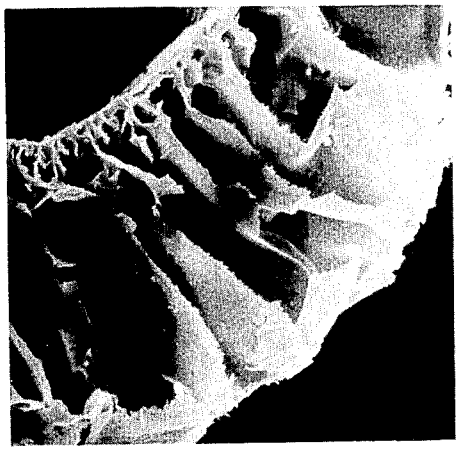
FIG. 3 is an electron-microscopic photograph of the cross-sectional area of a conventional cellulose acetate membrane of asymmetric structure.
Figure 4:
FIG. 4 is an electron-microscopic photograph of the cross-sectional area of a conventional PVA membrane of dense-layer structure.

The membrane of the present invention is a porous PVA membrane, the cross-section of which presents a substantially uniform distribution of micropores having an average diameter of 0.02 to 2 microns with interpore wall thicknesses ranging from 50 to 5,000 Angstrom units. Thus, in sharp contrast to the conventional semipermeable membranes, the PVA membrane of this invention has a multiplicity of micropores substantially uniformly distributed and arranged throughout the membrane, with the partition wall defining each micropore being extremely thin as compared to the pore walls of conventional membranes. Thus, as is apparent from FIG. 2 for instance, a multiplicity of micropores in a certain limited range of diameters are distributed with substantial uniformity across the membrane of this invention. FIGS. 1, 3 and 4 were photographed at a magnification of 1,000.

The term 'substantial uniformity' as used throughout this specification refers to: a membrane having micropores of substantially identical pore diameters across the entire thickness thereof; a membrane having micropores of substantially identical pore diameters across the entire thickness thereof; a membrane having micropores whose diameters vary continuously or stepwise from one side of the membrane to the other within the range of 0.02 to 2 microns; and a membrane of either one of the above structures provided with at least one extremely thin superficial skin layer, the thickness of which is within the range of about 1 to 50 times the average thickness of the interpore walls, as formed on either side of the structure.

Of course, for the embodiment of the present membranes characterized by having skin layers, the above multiplication factor, i.e., 1 to 50 times, is preferably small when the interpore wall thickness is comparatively large. The most outstanding features of the present membrane are the above-described micropore and interpore wall structures, and the fact that the membrane has a unique characteristic in that even the formation of the superficial skin layer on the above basic structure does not cause any reduction in membrane permeability.

Figure 5:
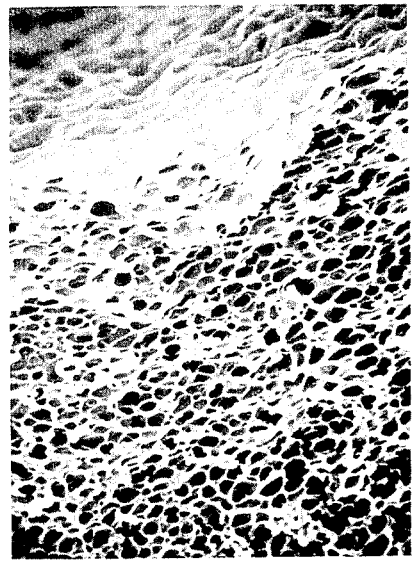
FIG. 5 is an electron-microscopic photograph of a section of a dry hollow fiber according to this invention.
Figure 2:
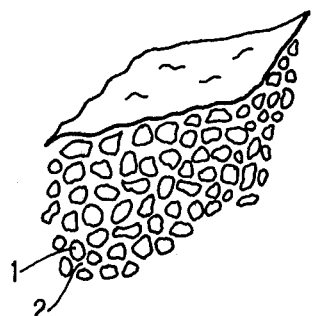
FIG. 2 is a schematic diagram illustrating the structure of the membrane of FIG. 1.

In the membrane of this invention, each micropore is defined by an extremely thin partition wall. The interpore wall has a thickness in the range of 50 to 5,000 Angstrom units. Referring to FIG. 2, a microfine pore (1) is surrounded by an interpore partitional wall (2). FIG. 5 is a photomicrogram ($\times$ 6,000) which shows a detailed structure of a membrane of the present invention. The photomicrogram shows that although the wall thickness varies somewhat from one zone to the other zone, the interpore walls located within the microporous structure according to this invention have thicknesses invariably within the range of 50 to 5,000 Angstrom units.

The membrane of the present invention is characterized by a multiplicity of micropores defined by thin interpore walls which are distributed with substantial uniformity throughout the membrane. It is because of the above unique structure that the membrane of the present invention has a water permeability as high as 0.5 to 200 cc/hr atm cm$^2$ and also, is highly permeable to such solutes as those which possess a middle molecular weight range of 300 to 3,000. If either the micropore diameter or the interpore wall thickness of the membrane deviates from the corresponding ranges mentioned above, the particular membrane cannot exhibit the above permeation properties. It is apparent that the aforementioned small interpore wall thickness of 50 to 5,000 Angstrom units is partly responsible for the unusually high water-permeability of the membrane of the present invention.

Because such micropores are arranged substantially uniformly, the membrane of this invention has excellent mechanical properties also. In the past, it has been believed that a membrane with a superior water permeability has an inferior mechanical strength, i.e., pressure resistance, it being difficult to achieve the two qualities in one membrane. Notwithstanding this, the membrane of the present invention fully withstands a pressure of 2 kg/cm$^2$ at a water permeability of $100 \times 10^{-2}$ cc/hr atm cm$^2$. In contrast, the conventional PVA membrane of homogeneous dense layer structure barely withstands a pressure as low as 0.1 kg/cm$^2$ at a water permeability of $100 \times 10^{-2}$ cc/hr atm cm$^2$.

Because of the unique combination of the aforementioned three structural features, the membrane of the present invention not only is highly permeable to water and solutes, but also has excellent mechanical properties.

The structural features of the present membranes can be demonstrated by the following procedure.

A flat membrane or hollow fiber, which is obtainable by the methods described hereinafter, is used as a test specimen. The specimen may be a wet, flat membrane or a hollow fiber or, alternatively, a product obtainable by drying a flat membrane of fiber and rewetting the same. The term 'wet' as used herein refers to the condition of a membrane after immersion in water at 30° C for 24 hours. The wet product is preliminarily frozen at a temperature not exceeding 0° C, preferably in the range of $-20°$ C to $-30°$ C, and thereafter freeze-dried in vacuo to obtain a dry product with a moisture content not exceeding about 10 percent. The product is further dried moisture-free and then frozen by immersion in liquid nitrogen. This product is dissected and coated with a thin layer of gold across its cross section. The coated specimen is placed on a Hitachi$^{(R)}$ HFS-2 scanning electron-microscope (manufactured by Hitachi Seisakusho K.K) and the secondary electron image of the specimen is observed at an accelerative voltage of 25 KV.

It may not be that the membrane of the present invention under actual wet conditions of use could retain the above exact structure, but the examination procedure described above is sufficient to ascertain the novel structure of the present membrane with good reproducibility.

The present invention, in another aspect, relates to a method for manufacturing a PVA membrane of the structure hereinbefore described. The PVA polymers employable in the manufacture of the above-described membrane include vinyl alcohol homopolymers having an average degree of polymerization in the range of 500 to 3,500 and a degree of saponification in the range of 85 to 100 mole percent; PVA copolymers containing less than 10 mole percent of such monomers as ethylene, vinyl pyrrolidone, vinyl chloride, methyl methacrylate, acrylonitrile and/or itaconic acid (including random, block and graft copolymers) and derivatives of said homopolymers and copolymers such as partially acetalized polymers and copolymers. The polyalkylene glycols employable according to this invention have an average molecular weight in the range of 400 to 4,000 and, preferably, in the range of 600 to 3,000 and have a carbon-to-oxygen ratio of not more than 3. Thus, for example, polyethylene glycol, polypropylene glycol and the corresponding copolymers with glycols containing more than four carbon atoms can be used. Polyalkylene glycols outside the aforementioned carbon-/oxygen ratio of not more than 3 display only poor compatibility with the polyvinyl alcohols, thus interfering with the preparation of a spinning dope having satisfactory spinnability or film-forming properties. On the other hand, the use of a polyalkylene glycol having an average molecular weight of less than 400 would still provide a spinning dope having satisfactory spinnability or film-forming properties but would not provide an adequate improvement in permeability performance over the convention products.

The blending ratio of polyalkylene glycol to polyvinyl alcohol is 2 to 200 parts by weight of PAG per one-hundred parts by weight of PVA and for still better results, 15 to 150 weight parts of PAG on the same basis. The effect of blending will not be sufficient if the proportion of PAG is less than the above threshold. Conversely, if the proportion of PAG is increased beyond the above upper limit, the resultant spinning dope will not be homogeneous or have satisfactory film-forming or spinning properties. Such a practice is not economically advantageous in that any improvement in permeability performance that may be gained will not be commensurate with the additional amount of PAG employed.

In a third aspect of the present invention, the proportions of PVA and PGA are further limited such that the final membrane having satisfactory permeability characteristics is obtained. Thus, the present invention is further directed to a method for manfacturing a membrane, wherein a polyvinyl alcohol polymer composition which contains 15 to 150 weight parts of a polyalkylene glycol having an average molecular weight of 600 to 3,000 and a carbon-to-oxygen ratio of not more than 3 per 100 weight parts of polyvinyl alcohol and in which the proportions of said polyvinyl alcohol and polyalkylene glycol satisfy the relation of $0.65 \leq CBR \leq 1.0$ (where CBR is the critical blending ratio) is coagulated in a liquid bath to yield a shaped article. In the context of this specification and the claims appended thereto, the term 'CBR' (critical blending ratio) has the following meaning.

There is a certain limit below which PAG dissolves in an aqueous solution of PVA to give a homogeneous solution. This critical blending ratio or limit is governed by such factors as the degree of polymerization and the degree of saponification of PVA, the temperature and concentration of the aqueous solution, and the type and molecular weight of PAG. The critical limit below which a given PAG dissolves in an aqueous PVA solution to yield a homogeneous solution as applicable to a given system in which such factors are known, is called the critical blending quantity (CBQ) of the particular PAG in that system. Now, if the blending quantity of PAG is below its CBQ, the PAG will blend evenly with the PVA to give a solution having excellent spinnability or film-forming properties. Should the quantity of PAG exceed its CBQ, the resultant mixture will suffer a phase separation which makes its spinning difficult. It has been found that, in order that the present semi-membrane of the above-described structure may be manufactured, the blending quantity of PAG must be within certain limits. Assuming that the blending quantity of PAG is BQ (blending quantity), the critical blending ratio (CBR) under certain predetermined conditions may be calculated by means of the equation $CBR = BQ/CBQ$, and a membrane having quite satisfactory properties can be manufactured from a dope for spinning or film-forming containing PAG in an amount satisfying the relation: $0.65 \leq CBR \leq 1.0$. A membrane of the above structure cannot be produced from a dope for spinning of film-forming wherein CBR is less than 0.65. The solution whose CBR is in excess of one has only poor spinnability and film-forming properties and does not permit stable spinning or molding. Preferably, the proportions of PVA and PAG are within the range of $0.80 \leq CBR \leq 1.0$.

Figure 6:
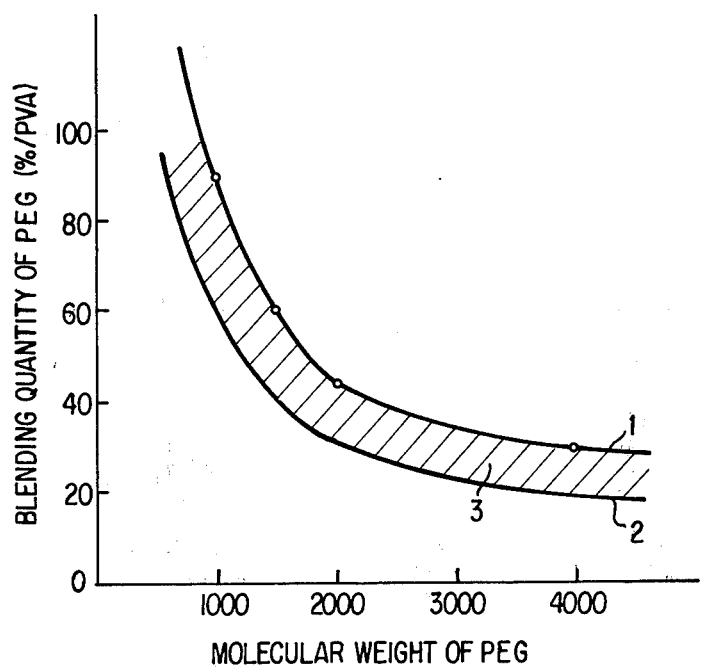
FIG. 6 is a diagram showing the CBR (critical blending ratio) range of the membrane of the present invention.

FIG. 6 is a diagrammatic representation of CBR, which shows the range of variation in CBR as plotted against the molecular weight of polyethylene glycol, by way of example, in a 16% aqueous solution, at 90° C, of polyvinyl alcohol with a degree of polymerization of 1,700 and a degree of saponification of 98.5%. Curve 1 represents the CBQ (CBR = 1) of this particular system and Curve 2 corresponds to CBR = 0.65. Therefore, the range of CBR that satisfies the above relation of this invention corresponds to the shaded area 3. Generally speaking, the higher the degree of saponification of PVA and/or the temperature of the solution, the larger is the CBQ, and the lower the molecular weight of PAG, the larger is the value of CBQ.

The above dope for spinning or film-forming is molded into a shaped article by a wet-coagulating process, that is to say by extruding the solution into a liquid, i.e., a coagulation bath. The desired permeability performance cannot be obtained by a dry spinning or melt spinning process, that is to say, by extruding the solution into a gaseous phase. The above description is easily adapted to film-forming processes, and therefore the present invention embodies both hollow fibers and flat membranes as well.

The wet coagulation of a PVA polymer is usually accomplished by any of the following procedures: (1) extruding an aqueous solution of PVA polymer into an aqueous solution of a dehydrating salt such as sodium sulfate, ammonium sulfate, potassium sulfate or sodium phosphate; (2) extruding an aqueous solution of PVA polymer into an aqueous solution of alkali, e.g., sodium hydroxide potassium hydroxide and lithium hydroxide, and (3) extruding an aqueous solution of PVA polymer containing boric acid or a salt thereof into an aqueous alkaline solution of sodium hydroxide and sodium sulfate. In the practice of the present invention, any of the aforementioned and other processes can be utilized. The second and third processes are preferred, however, and, for the purposes of the present invention, the latter process can be practiced with the highest stability and is the most desirable. Of course, aside from the aforementioned aqueous coagulation process, the processes can be subjected to various modifications such as using an organic solvent such as dimethylsulfoxide as a solvent for the dope, or using such a solvent as acetone, a lower alcohol or the like as a constituent of the coagulation bath. Following coagulation, the shaped article can be subjected to such steps as stretching between rollers, neutralization, application of a salt solution and so forth. If necessary, the product can be rinsed and stretched or otherwise treated under wet-hot conditions. The flat membrane or hollow fiber thus obtained can be directly put to use in a wet or dry state, but, if desired, it can be further subjected to a wet-heat treatment, a dry-heat treatment or a dry-heat stretching to form more dense interpore walls and, thereby, modify the selectivity of separation. Moreover, at an optional stage following the coagulation, the membrane can be subjected to a PVA modification treatment such as acetalization with a monoaldehyde such as formaldehyde, acetaldehyde, chloroacetoaldehyde, benzaldehyde, or the like; a dialdehyde such as glutaraldehyde, glyoxal, a PVA dialdehyde obtainable by oxidative degradation of PVA with periodate ion or cerium ion, or the like; esterification or etherification, whereby the separation selectivity and water permeability may be further modified or improved.

The flat membrane or hollow-fiber obtained as above can be subjected to a swelling treatment so that its permeability characteristics can be further improved. The swelling treatment as the term is used herein means the immersion of a membrane in warm water at 30° to 60° C, or in hot water at more than 60° C to 120° C. This treatment is effective in that it not only ameliorates the permeability performance, but removes PAG. Of course, the swelling treatment may be followed by any of various heat-treatments or treatments to modify the PVA so as to intorduce further modifications into the characteristics of the membrane.

The flat membrane or hollow-fiber membrane thus obtained can be put to use in a wet condition. Drying of this membrane can be accomplished by applying an organic solvent, an aqueous salt solution or an oiling agent to the wet membrane to prevent inter-membrane adhesion and allowing the membrane to dry in air or heating at atmospheric or subatmospheric pressure. Another procedure is freeze-drying the membrane in vacuo. The PVA membrane has a distinct characteristic not found in other polymeric membranes, in that its permeability performance is substantially not adversely affected by drying.

The hollow fiber thus obtained has an outer diameter of about 50 ~ 3,000 more preferably about 100 ~ 2,000 $\mu$, and the thickness thereof is about 10 ~ 500 $\mu$, more preferably 10 ~ 100 $\mu$. The flat membrane has a thickness of about 5 ~ 2,000 $\mu$, more preferably about 10 ~ 1,000 $\mu$.

The membrane according to this invention has a high water permeability, i.e., 0.5 to 200 cc/hr atm cm$^2$, as well as excellent mechanical properties. This means that the membrane is useful ultrafiltration applications. Furthermore, since the membrane of this invention retains the characteristics of PVA as such, i.e., resistance to alkalies, acids, chemicals and microorganisms, it can be used even in systems where severe pH conditions prevail or various chemicals are concomitantly present. In industrial applications, for instance, the membrane of the present invention may be used in the treatment of alkaline waste liquors from the degreasing of metal products, or waste pickling liquors, and in the concentration of strongly alkaline rubber latexes. Furthermore, scale and other deposits which are produced in the course of prolonged usage may be easily removed by acid or strong alkali washing so that the membrane can be reused again and again. Thus, whereas most of the conventional membranes could only be descaled by physical or mechanical means, the membrane of this invention lends itself well to chemical cleaning. Furthermore, since the membrane of this invention is highly permeable to substances of intermediate molecular weight, such as urea and vitamin B$_{12}$, it can also be of value as a dialytic membrane for artificial kidneys.

Having generally described this invention, a further understanding can be obtained by reference to certain specific examples which are provided herein for purposes of illustration only and are not intended to be limiting unless otherwise specified.

EXAMPLES 1 AND 2, and CONTROL EXAMPLE 1

In the proportions set forth in Table 1, polyvinyl alcohol (PVA) with a degree of saponification of 99.9 mole % and a degree of polymerization of 1,700 and polyethylene glycol (PEG) with an average molecular weight of 2,000 were dissolved in water under heating at 100° C to prepare a homogeneous aqueous solution (concentration of PVA = 16%).

The above spinning dope was extruded from a spinneret having an annular orifice into an aqueous coagulation bath (300 g/l NaOH) and the extrudate was stretched between rollers, neutralized with acid and conditioned (pH adjusted) with a Na$_2$SO$_4$ bath until the inside of the hollow fiber formed was adjusted to pH 7.

The wet hollow fiber obtained in Example 2 was freeze-dried under the following conditions: speciment (fiber obtained) temperature $-15°$ C, trap temperature $-50°$ C and a vacuum of 1.0 Torr. The procedure resulted in a dry hollow fiber with a moisture content of 9%. Examination of a sectional specimen of the dry hollow fiber under an electron-microscope revealed a uniform distribution across the fiber of a multiplicity of micropores with diameters in the range of 0.05 to 0.9 microns surrounded by interpore walls having thicknesses in the range of 70 A to 800 A. The water-permeability of the hollow fiber as measured at 36° C is set forth in Table 1. Three-hundred hollow fibers, each 20 cm long, were bundled in the fabrication of a small dialyzing unit and the dialysis values of the unit for urea and vitamin B$_{12}$ were measured. These values, as well as the wet strength of the fiber, are also shown in Table 1. It is evident that the hollow fiber of Example 2, wherein CBR = 0.83 which satisfies the relation: $0.65 \leq$ CBR $\leq 1.0$ has excellent permeability properties, especially to water. The hollow fiber of Example 1 has a low CBR and, although its performance is not as high as the fiber of Example 2, it is still better than the product of Control Example 1 and has a practical value.

TABLE 1

| | Blending quantity of PEG. %PVA | CBR | Water permeability cc/hr. atm. cm$^2$ | Dialysis cc/min Urea | VB$_{12}$ | Strength g/dr |
|---|---|---|---|---|---|---|
| Control Example 1 | 0 | 0 | 6 × 10$^{-2}$ | 1.7 | 0.15 | 0.05 |
| Example 1 | 10 | 0.33 | 10 × 10$^{-2}$ | 2.5 | 0.20 | 0.05 |
| Example 2 | 25 | 0.83 | 500 × 10$^{-2}$ | 4.0 | 0.60 | 0.12 |

EXAMPLES 3 to 6 and CONTROL EXAMPLES 2 and 3

In the proportions set forth in Table 2, polyvinyl alcohol (PVA) with a degree of saponification of 98.5 mole% and a degree of polymerization of 1,700 and polyethylene glycol with an average molecular weight of 1,000 were dissolved together with 2% PVA of boric acid in water with heating at 100° C to prepare a homogeneous aqueous solution (concentration of PVA: 16%). This aqueous dope was extruded from a spinneret having an annular orifice into a coagulation bath comprising NaOH/Na$_2$SO$_4$ = 80/230 g/l, and the extrudate was stretched 50% between rollers, neutralized and conditioned to pH 7 in a Na$_2$SO$_4$ bath. The resultant hollow fiber was immersed in a bath comprising NaI- $O_4/H_2SO_4/Na_2SO_4 = 3/150/150$ g/l at 50° C for 5 hours, whereby the crosslinking of PVA was accomplished. The fiber was further immersed in hot water at 92° C for 3 hours, at the end of which time it was rinsed with water.

The wet hollow fibers obtained in Control Example 2 and Example 6 were each freeze-dried under the following conditions: fiber temperature −20° C, trap temperature −70° C and a vacuum of 0.5 Torr. In each instance, the procedure provided a dry hollow fiber with a moisture content of 8%, an outer diameter of 460 μ and a thickness of 80 μ. FIG. 5 is an electronmicroscopic photograph shownning the sectional structure of the dry hollow fiber obtained in Example 6. The interpore partition walls have thicknesses within the range of 200 A to 900 A, thus being extremely thin and substantially uniform. The micropores are also very uniform, ranging from 0.1 to 0.8 μ in diameter, and are distributed with excellent uniformity over the entire section. The inner and outer surfaces of the hollow fiber are each made up of a thin dense layer having an average thickness of 1,000 A with no micropores being detected under an electron-microscope therein. The sectional structure of the dry hollow fiber obtained in Control Example 2 is shown in FIG. 4. It will be seen that substantially the entire cross-section reveals a dense layer substantially free of micropores, in sharp contrast to the structure of FIG. 5. Table 2 shows the permeability characteristics and wet strength values of these hollow fibers. It is obvious that, in permeability performance, the hollow fibers prepared by blending PEG in the proportions satisfying the conditions of this invention are superior to the fibers containing PEG in any proportion outside the range. Examples 4 and 5 also show that, where CBR is about 0.65 or higher, the resultant membranes display particularly excellent properties.

TABLE 2

|  | Blending quantity of PEG, %/PVA | CBR | Water permeability cc/hr. atm. cm$^2$ | Dialysis cc/min Urea | VB$_{12}$ | Strength g/dr |
|---|---|---|---|---|---|---|
| Control Example 2 | 0 | 0 | 3 × 10$^{-2}$ | 1.5 | 0.12 | 0.10 |
| Control Example 3 | 1 | 0.03 | 3 × 10$^{-2}$ | 1.5 | 0.12 | 0.10 |
| Example 3 | 20 | 0.22 | 7 × 10$^{-2}$ | 1.8 | 0.17 | 0.10 |
| Example 4 | 55 | 0.61 | 9 × 10$^{-2}$ | 1.8 | 0.17 | 0.10 |
| Example 5 | 60 | 0.67 | 50 × 10$^{-2}$ | 3.5 | 0.40 | 0.18 |
| Example 6 | 80 | 0.89 | 200 × 10$^{-2}$ | 4.8 | 0.58 | 0.22 |

EXAMPLES 7 and 8 and CONTROL EXAMPLE 4

In the proportions set forth in Table 3, polyvinyl alcohol (PVA) with a degree of saponification of 98.5% and a degree of polymerization of 2,400 and polyethylene glycol with an average molecular weight of 1,000 were dissolved together with boric acid (2 wt% based on PVA) with heating at 100° C to prepare a homogeneous aqueous solution (concentration of PVA: 14%). This dope was extruded from a spinneret having an annular orifice into a coagulation bath comprising $NaOH/Na_2SO_4 = 70/240$ g/l to obtain a hollow fiber. The fiber was then immersed in a bath comprising glutaraldehyde/$H_2SO_4/Na_2SO_4$ = 3/3/200 g/l at 70° C for 5 hours, whereby PVA was cross-linked and further immersed in hot water at 93° C for 3 hours, followed by an aqueous rinse. The wet hollow fiber obtained in Example 8 was freeze-dried under the same conditions as described in Example 6 to obtain a dry hollow fiber with a moisture content of 7%. This hollow fiber had an outer diameter of 360 μ and a thickness of 60 μ. The structure of this dry hollow fiber as revealed by electron-micrograph was such that the fiber included a multiplicity of micropores varying from 0.2 to 1.0 μ in diameter surrounded by interpore partition walls ranging in thickness from 100 to 700 A. The micropores located near the inside surface had diameters in the range of about 0.7 to 1 μ, with progressively smaller micropores disposed toward the outer surface. The permeability characteristics and wet strength values of the hollow fibers are set forth in Table 3.

TABLE 3

|  | Blending quantity of PEG, %PVA | CBR | Water permeability cc/hr.atm. cm$^2$ | Dialysis cc/min Urea | VB$_{12}$ | Strength g/dr |
|---|---|---|---|---|---|---|
| Control Example 4 |  | 0 | 0.5 × 10$^{-2}$ | 1.0 | 0.08 | 0.10 |
| Example 7 | 50 | 0.41 | 3 × 10$^{-2}$ | 1.5 | 0.12 | 0.15 |
| Example 8 | 100 | 0.83 | 400 × 10$^{-2}$ | 6.0 | 0.70 | 0.30 |

EXAMPLES 9 and 10 and CONTROL EXAMPLE 5

In the proportions set forth in Table 4, polyvinyl alcohol (PVA) with a degree of saponification of 99.9 mole% and a degree of polymerization of 1,700 and polyethylene glycol (PEG) with a molecular weight of 1,000 were dissolved at 100° C to prepare a homogeneous aqueous solution (concentration of PVA: 16%). The dope was passed down through a slit into an aqueous coagulation bath comprising 320 g/dl of NaOH at 35° C whereby a flat membrane was obtained. The flat membrane was then immersed in an aqueous solution of $H_2SO_4/Na_2SO_4 = 120/300$ g/l and the neutralized fiber was then rinsed well with water.

The wet membrane obtained in Example 10 was freeze-dried under the same conditions as Example 8 to prepare a dry membrane having a moisture content of 6% and a thickness of 50 μ. The sectional structure of this dry membrane was such that it contained a multiplicity of micropores varying from 0.3 to 1.0 μ in diameter as defined by thin interpore walls ranging from 70 to 700 A in thickness and distributed uniformly throughout the entire section. The permeability characteristics and strength values are set forth in Table 4.

TABLE 4

|  | Blending quantity of PEG, %PVA | CBR | Water permeability cm$^2$ | Diffusion coefficient cm$^2$/sec Urea | VB$_{12}$ | Strength kg/mm$^2$ |
|---|---|---|---|---|---|---|
| Control Example 5 | 0 | 0 | 8 × 10$^{-16}$ | 6.8 × 10$^{-7}$ | 6.9 × 10$^{-8}$ | 1.3 |
| Example 9 | 20 | 0.28 | 16 × 10$^{-2}$ | 18.2 × 10$^{-7}$ | 20.1 × 10$^{-8}$ | 1.3 |
| Example 10 | 60 | 0.86 | 80 × 10$^{-2}$ | 30.3 × 10$^{-7}$ | 38.2 × 10$^{-8}$ | 1.9 |

EXAMPLE 11 and CONTROL EXAMPLES 6 and 7

Polyvinyl alcohol (PVA) with a degree of polymerization of 1,500 was dissolved in water to prepare an 8% aqueous solution. To this solution was added 30% polyethylene glycol (PEG) with a molecular weight of 2,000 together with 1.5% of boric acid. The mixture was thoroughly stirred into a homogeneous solution which was then defoamed. This stock solution was adjusted to 30° C and passed through a slit into a coagulation bath comprising 50 g NaOH, 200 g $Na_2SO_4$ and 1,000 g $H_2O$ whereby a flat membrane was obtained. To neutralize the alkali within the flat membrane, the flat membrane was passes through a neutralization bath comprising 100 g $H_2SO_4$, 250 g $Na_2SO_4$ and 1,000 g $H_2O$ and, then, rinsed well with water.

The permeability characteristics and strength values of the membranes are set forth in Table 5.

TABLE 5

| | Blending quantity PEG, % of PVA | Thickness mm | Diffusion coefficient $cm^2$/sec | | Strength $kg/mm^2$ |
|---|---|---|---|---|---|
| | | | Urea | $VB_{12}$ | |
| Control Example 6 | 0 | 0.185 | $6.8 \times 10^{-7}$ | $6.7 \times 10^{-8}$ | 1.3 |
| Control Example 7 | 1 | 0.185 | $6.8 \times 10^{-7}$ | $6.9 \times 10^{-8}$ | 1.2 |
| Example 11 | 30 | 0.185 | $19.3 \times 10^{-7}$ | $20.4 \times 10^{-8}$ | 1.2 |

Substantially the same results were obtained when, in the above examples, polypropylene glycol was used in lieu of polyethylene glycol, provided that the conditions of this invention as set forth in this specification are adhered to.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A polyvinyl alcohol membrane prepared by the process which comprises:
    extruding an aqueous PVA polymer composition containing a polyalkylene glycol having an average molecular weight of 600 to 3,000 and a carbon-to-oxygen atom ratio of not more than 3 in a proportion of 15 to 150 part by weight per 100 parts by weight of PVA, wherein said composition satisfies the relationship: $0.65 \leq CBR \leq 1.0$; wherein CBR is defined as the critical blending ratio onto a coagulation bath and
    coagulating the extruded composition such that a resultant shaped article is formed.

2. The PVA membrane of claim 1, wherein said micropores are arranged with substantial uniformity over the entire sectional area thereof.

3. The PVA membrane of claim 1, wherein said micropores vary in diameter continuously from one side of the membrane to the other side.

4. The semi-permeable membrane of claim 1, wherein the membrane, on at least either side thereof, has a superficial skin layer, the thickness of which is within the range of about 1 to about 50 times the average thickness of said interpore partition walls.

5. The membrane of claim 1, which has a water permeability as high as 0.5 to 200 cc/hr atm $cm^2$.

6. The membrane of claim 1, which can withstand a pressure of at least 2 $kg/cm_2$ at a water permeability of $100 \times 10^{-2}$ cc/hr atm $cm^2$.

7. The PVA membrane of claim 1, wherein said micropores vary in diameter in a stepwise fashion from one side of said membrane to the other side.

8. The membrane of claim 1, which is a flat membrane having a thickness of $5 \sim 2,000$ $\mu$.

9. The membrane of claim 1, which is a hollow fiber having an outside diameter of $50 \sim 3,000$ $\mu$ and a thickness of $10 \sim 500$ $\mu$.

10. The PVA membrane of claim 1, wherein the membrane has been subjected to an acetalization treatment with at least one monoaldehyde selected from the group consisting of formaldehyde, acetaldehyde, chloroacetoladehyde and benzaldehyde.

11. The PVA membrane of claim 1, wherein said membrane has been subjected to an acetalization treatment with a dialdehyde selected from the group consisting of glutaraldehyde, glyoxal and PVA dialdehyde.

12. The PVA membrane of claim 11, wherein said dialdehyde is glutaraldehyde.

13. A method of producing a polyvinyl alcohol membrane, which comprises:
    extruding an aqueous PVA polymer composition containing a polyalkylene glycol having an average molecular weight of 600 to 3,000 and a carbon-to-oxygen atom ratio of not more than 3 in a proportion of 15 to 150 parts by weight per 100 parts by weight of PVA, wherein said composition satisfies the relationship: $0.65 \leq CBR \leq 1.0$; wherein CBR is defined as the critical blending ratio onto a coagulation bath and
    coagulating the extruded composition such that a resultant shaped article is formed.

14. A method of claim 13, wherein the PVA polymer of said composition is selected from the group consisting of vinyl alcohol homopolymers having an average polymerization degree in the range of 500 to 3,500 and a saponification degree in the range of 85 to 100 mole percent; PVA copolymers containing less than 10 mole percent of an ethylene, vinylpyrrolidone, vinyl chloride, methyl methacrylate, acrylonitrile or itaconic monomer or mixtures thereof; and derivatives of said homopolymers and copolymer.

15. The method of claim 13, wherein said polyalkylene glycol is polyethylene glycol, polypropylene glycol or copolymers of said glycols with glycols containing more than four carbon atoms.

16. The method of claim 13, wherein the critical blending ratio is within the limits of $0.80 \leq CBR \leq 1.0$.

* * * * *

UNITED STATES PATENT AND TRADEMARK OFFICE
CERTIFICATE OF CORRECTION

PATENT NO. : 4,073,733

DATED : February 14, 1978

INVENTOR(S) : Kazuhisa Yamauchi, Koichi Takakura, Syuji Kawai, Akio Ohmori

It is certified that error appears in the above-identified patent and that said Letters Patent are hereby corrected as shown below:

On the front page:

Under "[30] Foreign Application Priority Data" please add to the list -- Apr. 9, 1976    Japan.................51-40538 --

Column 2, line 24, delete "application" and insert -- applications --

Column 5, line 12, delete "convention" and insert -- conventional --

Column 5, line 28, delete "PGA" and insert -- PAG --

Column 6, line 5, delete "of" and insert -- or --

Column 7, line 20, delete "intorduce" and insert -- introduce --

Column 8, line 20, delete "speciment" and insert -- specimen --

UNITED STATES PATENT OFFICE
CERTIFICATE OF CORRECTION

Patent No. 4,073,733              Dated February 14, 1978

Inventor(s) Kazuhisa Yamauchi et al.

It is certified that error appears in the above-identified patent and that said Letters Patent are hereby corrected as shown below:

Column 9, line 13, delete "showning and insert -- showing --
Column 9, line 42, delete "%/PVA" and insert -- % PVA --
Column 10, line 27, under heading "Blending quantity of PEG, % PVA" for Example 4, insert -- 0 --.

Column 8, line 48, delete "%PVA" and insert --%/PVA--.

Column 9, line 42, delete "%PVA" (inserted in previous Certificate of Correction) and insert --%/PVA--.

Column 10, line 25, delete "%PVA" and insert --%/PVA--;

Column 10, line 59, delete "%PVA" and insert --%/PVA--.

Column 11, lines 18-19, delete "% of PVA" and insert --%/PVA--.

UNITED STATES PATENT AND TRADEMARK OFFICE
CERTIFICATE OF CORRECTION

PATENT NO. : 4,073,733

DATED : February 14, 1978

INVENTOR(S) : Kazuhisa Yamauchi, Koichi Takakura, Syuji Kawai, Akio Ohmori

It is certified that error appears in the above-identified patent and that said Letters Patent are hereby corrected as shown below:

Column 10, line 61, delete "$16 \times 10^{-2}$" and insert -- $16 \times 10^{-16}$ --

Column 10, line 62, delete "$80 \times 10^{-2}$" and insert -- $80 \times 10^{-16}$ --

Column 11, line 10, delete "passes" and insert -- passed --

Column 11, line 20, delete "$6.7 \times 10^{-8}$" and insert -- $6.9 \times 10^{-8}$ --

Column 11, line 44, delete "onto" and insert -- ,into --

Column 12, line 40, delete "onto" and insert -- , into --

Signed and Sealed this

Second Day of January 1979

[SEAL]

Attest:

RUTH C. MASON
Attesting Officer

DONALD W. BANNER
Commissioner of Patents and Trademarks